United States Patent [19]

Auld, Jr. et al.

[11] Patent Number: 4,703,354
[45] Date of Patent: Oct. 27, 1987

[54] NON-LINEAR SYNC SIGNAL PROCESSING CIRCUIT

[75] Inventors: Frederick H. Auld, Jr., Wheeling; David L. Walker, Arlington Heights, both of Ill.

[73] Assignee: Zenith Electronics Corporation, Glenview, Ill.

[21] Appl. No.: 610,560

[22] Filed: May 16, 1984

[51] Int. Cl.$^4$ .................................................. H04N 5/04
[52] U.S. Cl. ...................................... 358/148; 358/150; 358/153; 328/108; 328/129.1; 328/139; 328/179; 307/234
[58] Field of Search ............... 358/319, 118, 119, 120, 358/122, 123, 148, 150, 153, 154, 155; 328/63, 78, 74, 108, 109, 110, 127, 129.1, 133, 139, 179, 187, 191, 193, 196, 201; 307/234, 265; 380/10, 15

[56] References Cited

U.S. PATENT DOCUMENTS

| | | |
|---|---|---|
| 3,553,365 | 1/1971 | Jauernik .......................... 358/155 |
| 3,903,356 | 9/1975 | Watatani et al. ................... 358/154 |
| 4,095,258 | 6/1978 | Sperber ........................... 358/118 |
| 4,523,228 | 6/1985 | Banker ............................ 358/120 |

Primary Examiner—James J. Groody
Assistant Examiner—Michael D. Parker

[57] ABSTRACT

A non-linear sync signal processor for deriving a sync-like signal from video information with suppressed sync signals includes a differentiating circuit for deriving pulse potentials from the leading and trailing edges of suppressed sync signals, a pair of comparators for generating signals corresponding to the pulse potentials and a pair of non-retriggerable monostable timers, one for creating a 6 microsecond first window in response to a leading edge and the other for creating a 58 microsecond second window in response to a trailing edge occurring in the first window. The second timer is enabled by operation of the first timer and the first timer is inhibited during operation of the second timer. Thus only sync-like signals having three characteristics of conventional sync signals are regenerated.

8 Claims, 3 Drawing Figures

NON-LINEAR SYNC SIGNAL PROCESSING CIRCUIT

BACKGROUND OF THE INVENTION

This invention relates generally to sync signal recovery systems and specifically to systems for recovering synchronizing signals that have been distorted.

The characteristics of synchronizing signals in NTSC television signals are controlled by FCC standards and are applicable to both over-the-air and cable transmissions. The width or duration of the synchronizing signal tip is specified to be 4.7±0.1 microseconds. In the 525 scanning line system used in the United States, the length of a horizontal line, that is the period between synchronizing signal tips, is 63.5 microseconds.

It is common in both over-the-air and cable transmissions, to encode or scramble television signals to prevent their unauthorized use by those not having the requisite decoding equipment. A very common form of scrambling involves suppression of sync signals so that conventional television receiver synchronizing signal circuits are incapable of recovering them. In those instances, a form of pilot signal or other sync signal reference is also transmitted to enable the decoding equipment to appropriately reconstitute the synchronizing signals. It is however, often desirable to have the capability of regenerating proper sync signal information from the video information alone, without the need for supplemental pilot or reference signals.

In the encoding system mentioned, the regenerated sync signals need to be identified as to vertical field to properly and automatically control the decoding equipment. This is because of field interlacing in the television signal which requires the regenerated sync signal to be correlated with the video display to result in a properly decoded signal.

OBJECTS OF THE INVENTION

The principal object of this invention is to provide a novel synchronizing signal recovery circuit.

Another object of this invention is to provide a non-linear synchronizing signal system for use with distorted sync signals.

A further object of this invention is to provide a processor for suppressed sync that requires only the video signal to reconstitute sync signals.

SUMMARY OF THE INVENTION

In accordance with the invention, a sync signal processing circuit for use with television signals incorporating sync signals having first, second and third characteristics comprises means for deriving a video signal including the sync signals, means for detecting signals in the video signal having the first characteristic, means for detecting signals in the video signal having the second characteristic and means for processing the detected signals to determine the presence of the third characteristic.

BRIEF DESCRIPTION OF THE DRAWINGS

Other objects and advantages of the invention will become apparent upon reading the following description in conjunction with the drawings of which.

DESCRIPTION OF THE PREFERRED EMBODIMENT

Figure 1:
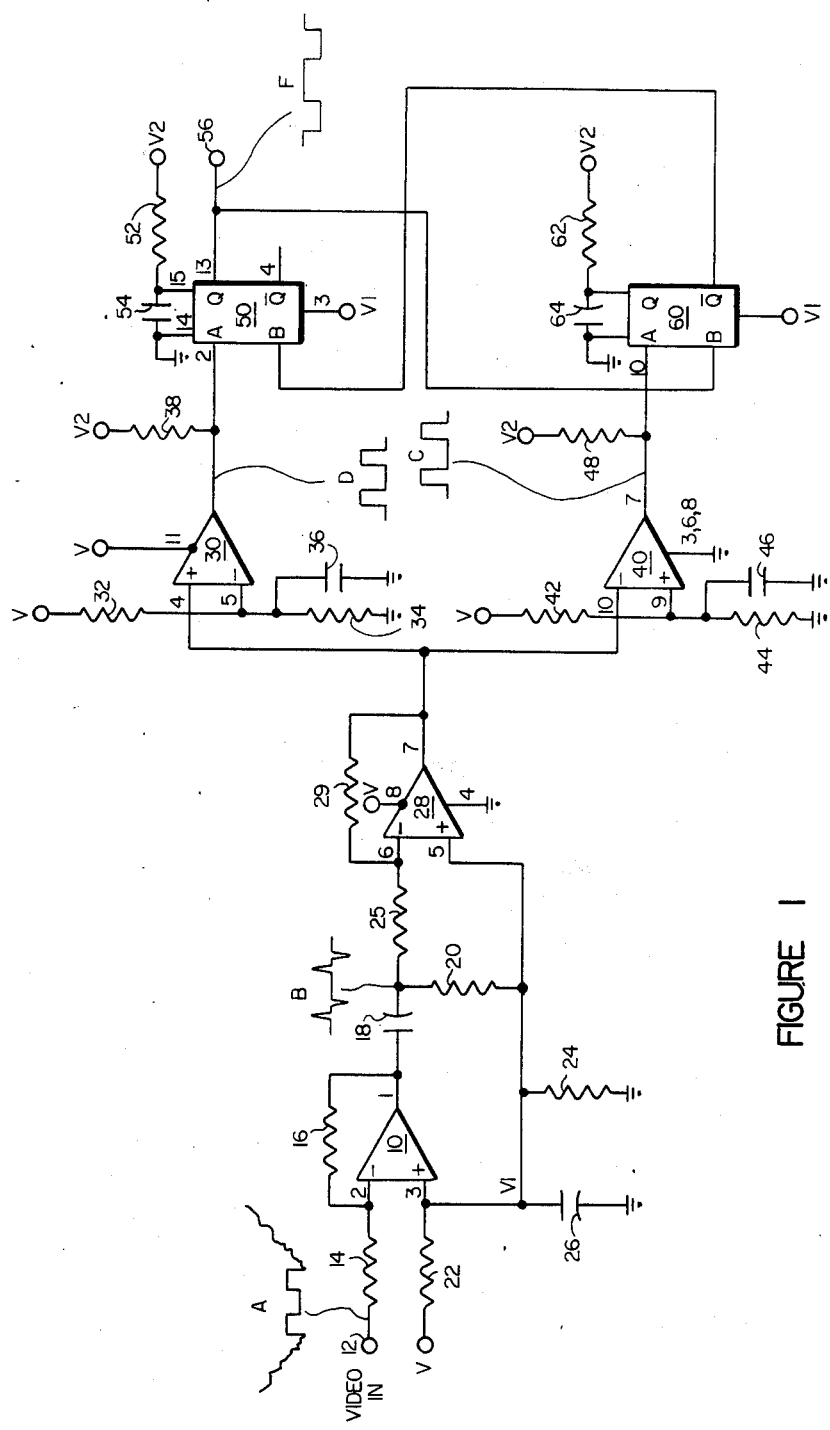
FIG. 1 is a schematic diagram of a non-linear sync processor constructed in accordance with the invention.

Referring to FIG. 1, an operational amplifier 10 has its negative input terminal connected through a resistor 14 to a video input terminal 12 and its positive input terminal connected to a fixed source of potential V1. The fixed potential V1 is developed at the junction of a resistor 22, connected to a voltage source V, and the parallel combination of a resistor 24 and a capacitor 26 connected to ground. The output terminal of amplifier 10 is coupled back to its negative input terminal by a feedback resistor 16. This output terminal is also connected to a capacitor 18 which, with a resistor 20, forms a differentiation network for the input baseband composite video signal at terminal 12. The lower end of resistor 20 is connected back to V1. Voltage V1 raises the level of the operational amplifier to assure that the positive and negative peaks of the differentiated signals are reproduced. The various waveforms indicated at points throughout the circuits are included for ease in understanding the operation of the invention. As shown, the sync is suppressed below the peaks of video signal.

The differentiated video signal is coupled through a resistor 25 to the negative input terminal of another operational amplifier 28 having its positive input terminal connected to V1 and its output terminal connected to its negative input terminal through a feedback resistor 29. The output terminal of amplifier 28 is coupled to a pair of comparators 30 and 40. Comparator 30 has its positive input terminal connected to the output terminal of amplifier 28 and its negative input terminal connected to the junction of a resistor 32 connected to a voltage source V, and to the parallel combination of a resistor 34 and a capacitor 36 connected to ground. Similarly, comparator 40 has its negative input terminal connected to the output terminal of amplifier 28 and its positive input terminal connected to the junction of a resistor 42 connected to voltage source V, and to the parallel combination of a resistor 44 and a capacitor 46 connected to ground. With this arrangement, comparator 40 operates on the negative-going signal output from amplifier 28 to produce a positive pulse output and comparator 30 operates on the positive-going signal output of amplifier 28 to produce a similar positive pulse output. As is shown more clearly in FIG. 2, the pulse outputs of the comparators are displaced in time with that of comparator 40 corresponding to negative-going signal changes including the leading edge of a suppressed sync pulse and that of comparator 30 corresponding to positive-going signal changes including the trailing edge of the suppressed sync pulse.

The output terminal of comparator 30 is coupled to a voltage source V2 through a resistor 38 and to a terminal A of a non-retriggerable monostable timer 50. An RC timing network, comprising a resistor 52 and a capacitor 54 connected between V2 and ground, is suitably coupled across timer circuit 50. The Q output terminal of timer 50 is connected to a sync output terminal 56 where a regenerated sync-like output is produced.

The output terminal of comparator 40 is connected to voltage source V2 through a resistor 48 and to a terminal A of another non-retriggerable monostable timer 60 having its B terminal connected to the Q terminal of timer 50. The RC timing network for timer 60 comprises a resistor 62 and a capacitor 64 coupled between V2 and ground. The $\overline{Q}$ output terminal of timer 60 is connected to the B terminal of timer 50. The timing durations of timers 60 and 50 are 6 microseconds and 58 microseconds, respectively.

Figure 2:
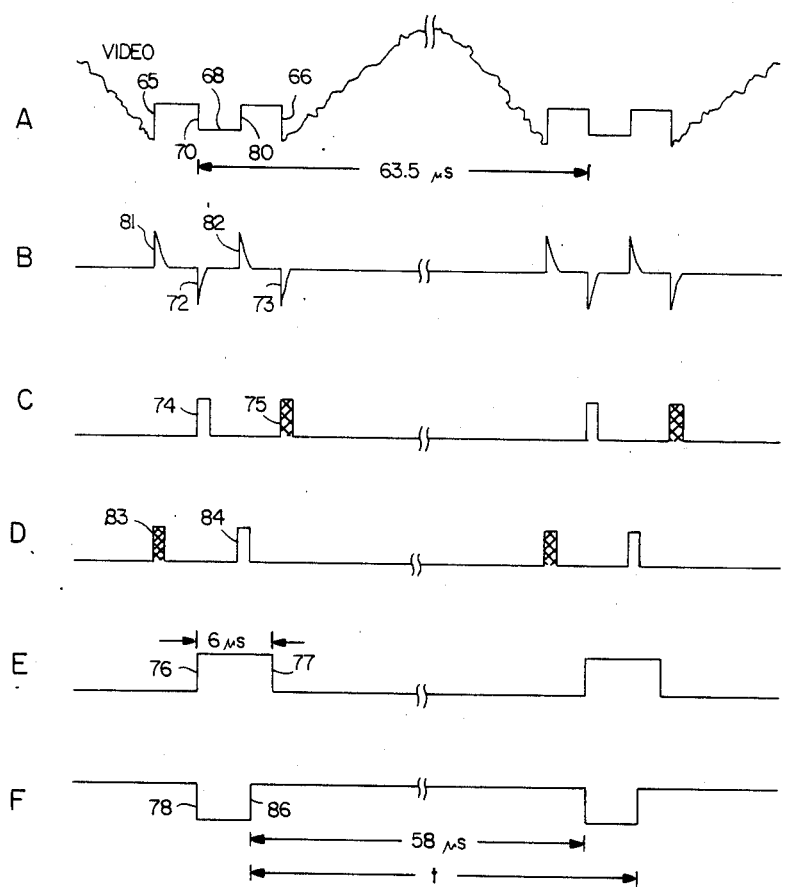
FIG. 2 is a series of waveforms illustrating operation of the invention.

Reference to FIG. 1 and FIG. 2 together may be of assistance in understanding the operation of the invention. In FIG. 2 waveform A represents the video signal at terminal 12 and includes a suppressed sync pulse 68 having a leading edge 70 and a trailing edge 80. The sync pulse is seen to be completely lost in the video signal. The width of the suppressed sync pulse, as mentioned above, is 4.7 microseconds and the time between sync pulses, that is between the leading edges of successive sync pulses, is 63.5 microseconds. Waveform B illustrates the differentiated signal present at the output terminal of amplifier 28 with peak 72 representing the leading edge of the sync pulse and portion 82 the trailing edge. Peak 81 corresponds to positive-going video portion 65 and peak 73 corresponds to negative-going video portion 66. Waveforms C and D represent the pulse outputs of comparators 40 and 30, respectively. The cross hatched pulses 83 and 75 correspond to video portions, whereas pulses 74 and 84 correspond to the leading and trailing edges of a suppressed sync pulse. As will be seen the inventive circuit only responds to pulses 74 and 84. Waveform E represents the signal at the $\overline{Q}$ terminal of timer 60 and is a pulse having a leading edge 76 and a trailing edge 77 and a duration of 6 microseconds. Waveform F represents the signal at the Q terminal of timer 50 and is a regenerated sync-like pulse having a leading edge 78 and a trailing edge 86. This pulse is formed by combining the effect of timer 60 on the input circuit of timer 50, since timer 50 is activated by timer 60 which in turn controls activation of timer 50. The potential on the Q terminal of timer 50 goes high and persists for 58 microseconds when activated. This potential renders timer 60 immune to triggering input signals at its terminal A during this period. While timer 60 is immune, pulse 75 is discriminated against and while timer 50 is immune, pulse 83 is discriminated against.

The circuit operates to seek a leading edge of a given polarity in the video signal and establish a first window during which a trailing edge of opposite polarity must appear. If such an edge appears, it is assumed that a sync pulse has been found and a second window is established to preclude other information until a minimum time period has elapsed. The timing of the windows is based upon knowledge of the characteristics of NTSC system synchronizing signals. It is the timing relationship, which is known for synchronizing signals, that is used to discriminate against video and noise.

Initially, the logic levels on the $\overline{Q}$ terminal of both timers 50 and 60 are high and those at their Q terminals are low. Timer 60 is therefore enabled (its B input terminal is connected to the low logic level at the Q terminal of timer 50) and will be triggered by a pulse from comparator 40 to begin a 6 microsecond timing interval (first window). Since the timer is non-retriggerable, it must be reset by appropriate voltage on the Q terminal of timer 50. Thus, when timer 60 is triggered, it enables the B input of timer 50 for 6 microseconds to look for a pulse from comparator 30 corresponding to the sync pulse trailing edge. If one occurs within the 6 microsecond period, timer 50 is triggered to begin a 58 microsecond period (second window) during which timer 60 is disabled since the Q terminal of timer 50 goes high. If a true sync signal has been detected rather than video or noise, a subsequent leading edge will be differentiated just after expiration of the 58 microsecond period.

Thus the regenerated signal is measured against three characteristics of a conventional sync signal. The first is that it has a leading edge of proper polarity; the second is that it has a trailing edge of opposite polarity occurring within a predetermined time of the leading edge; and the third, is that the period between successive pulses is correct. The circuit of the invention determines the presence of a leading edge, establishes a 6 microsecond first window for the detection of a trailing edge and establishes a 58 microsecond second window from the trailing edge before a subsequent leading edge will be recognized. It will be appreciated that the leading edges of the pulses may not necessarily be precisely timed in their occurrence because upon expiration of the 58 microsecond window, the voltage on the Q terminal of timer 50 goes low and marks the beginning of a new regenerated pulse although this is before the occurrence of a subsequent sync pulse. The trailing edges of the regenerated pulses, however are in precise time relationship and subsequent sync processing circuitry (not shown) is triggered by these trailing edges.

Figure 3:
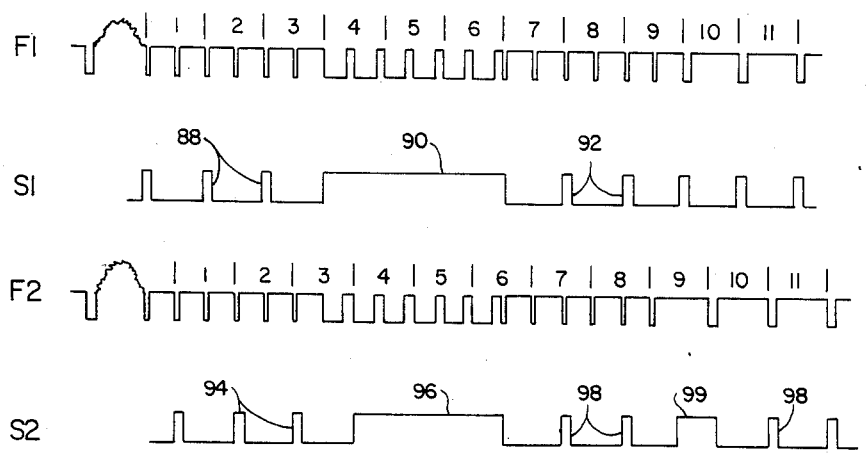
FIG. 3 is a series of waveforms indicating the vertical field identification feature of the invention.

In FIG. 3, a portion of the synchronizing signal corresponding to two successive television signal vertical blanking intervals is depicted. Specifically during one vertical blanking interval, narrow equalizing pulses occur in the signal for three horizontal lines and broad pulses occur for three lines to develop the vertical blanking pulse. Because of field interlacing of the scanned television picture, only half of the horizontal lines are scanned during each field with successive fields being interlaced. Thus successive vertical blanking intervals include sync signals displaced by one half of a line. The circuit of the invention does not respond to the narrow equalizing pulses because of the second window timing interval but does respond to the displaced sync-like signals to yield regenerated sync signals that are identifiably different for the two fields. Specifically a broad horizontal "sync" pulse is generated during one field which may be used as an identifier of that particular field. In the other field, the vertical blanking pulse developed is slightly narrower, which has no adverse effect on system operation.

Waveform F1 represents a portion of the video signal commencing with horizontal line 1 of the vertical blanking interval. The narrow equalizing pulses during lines 1, 2, and 3, the broad vertical pulses during lines 4, 5, and 6 and the narrow equalizing pulses during lines 7, 8, and 9 of F1 should be compared with their counterpart pulses of F2, which represents the next vertical interval. The displacement of one half line in commencing horizontal line 1 results in line 9 not having an equalizing pulse.

The circuit of the invention produces regenerated sync-like signals depicted by waveforms S1 and S2, corresponding to F1 and F2, respectively. Pulses 88, 90, and 92 are developed in response to F1. In S2 however, the one half line displacement causes the last of pulses 94 positioned at the beginning of line 3, to be followed one half line later by the first broad vertical pulse. This latter pulse occurs before the second window has terminated and is therefore ignored by the circuit of the invention. The result is a slightly shorter duration vertical pulse 96. At the end of pulse 96, the equalizing pulses are again ignored by the circuit of the invention and pulses 98 are generated. The last equalizing pulse (in line 9) is missing in F2 and the second window terminates thus creating a wide pulse 99 until the next pulse 98 is generated. Broad pulse 99 is thus a distinct identifier marking the particular one of the two different vertical fields being transmitted.

What has been described is a novel non-linear sync processing circuit for generating a sync-like signal from only the video signal despite distortions in the sync signal. It will be appreciated that the circuit may also be used to generate sync-like signals from video information in which the sync signals are not distorted. It is recognized that numerous modifications and changes in the described embodiment of the invention will be apparent to those skilled in the art without departing from the true spirit and scope thereof. The invention is to be limited only as defined in the claims.

What is claimed is:

1. A sync signal processing circuit for use in a television system with a video signal including sync signals, each having first, second and third characteristics, comprising:
    means for detecting said first characteristic in sync signals in said video signal;
    means for detecting said second characteristic in sync signals in said video signal; and
    means for processing successive sync signals having said detected characteristics to determine if said third characteristic is correct.

2. The circuit of claim 1, wherein said first characteristic is the leading edge polarity of sync pulses, said second characteristic is the trailing edge polarity of said sync pulses occurring within a predetermined time of said leading edges, and said third characteristic is the time between successive sync pulses.

3. The circuit of claim 2, including first window means for creating a first window in response to sync signals having said detected first characteristic; and
    second window means creating a second window in response to sync signals having said detected second characteristic to determine if said third characteristic is correct.

4. The circuit of claim 3, wherein said first and said second window means include a first and a second timer, and further including a differentiating circuit coupled to said first and said second window means.

5. The circuit of claim 4, wherein said first timer is activated by sync signals having said detected first characteristic and said second timer is activated by sync signals having said detected second characteristic and occurring during said first window.

6. A non-linear sync processor for a television signal including suppressed sync signals comprising:
    differentiation means for detecting leading and trailing edges of said suppressed sync signals;
    first window means including a first timer activated by a first of said leading edges for establishing a period slightly in excess of the time between said leading and trailing edges;
    second window means, including a second timer activated by a first of said trailing edges occurring during said first window for establishing a second window of a duration slightly less than the time interval between successive sync signals; and
    means interconnecting said second timer and said first timer to inhibit said first timer during said second window.

7. The processor of claim 6 wherein said first timer has a duration of 6 microseconds and said second timer has a duration of 58 microseconds.

8. The processor of claim 6 wherein said first and said second timers are non-retriggerable monostable circuits.

* * * * *